United States Patent
Nixon et al.

(10) Patent No.: US 11,192,298 B2
(45) Date of Patent: Dec. 7, 2021

(54) LASER PREHEATING IN THREE-DIMENSIONAL PRINTING

(71) Applicant: Stratasys, Inc., Eden Prairie, MN (US)

(72) Inventors: Jason Robert Nixon, St. Paul, MN (US); Clint Newell, Eden Prairie, MN (US); Timothy Diekmann, Maplewood, MN (US)

(73) Assignee: Stratasys, Inc., Eden Prairie, MN (US)

(*) Notice: Subject to any disclaimer, the term of this patent is extended or adjusted under 35 U.S.C. 154(b) by 56 days.

(21) Appl. No.: 16/544,414

(22) Filed: Aug. 19, 2019

(65) Prior Publication Data

US 2020/0055239 A1    Feb. 20, 2020

Related U.S. Application Data

(60) Provisional application No. 62/765,009, filed on Aug. 17, 2018.

(51) Int. Cl.
*B29C 64/194* (2017.01)
*B33Y 10/00* (2015.01)
(Continued)

(52) U.S. Cl.
CPC .......... *B29C 64/194* (2017.08); *B29C 64/118* (2017.08); *B29C 64/295* (2017.08); *B33Y 10/00* (2014.12); *B33Y 30/00* (2014.12)

(58) Field of Classification Search
CPC .... B29C 64/118; B29C 64/194; B29C 64/295
See application file for complete search history.

(56) References Cited

U.S. PATENT DOCUMENTS

| | | |
|---|---|---|
| 5,866,058 A | 2/1999 | Batchelder et al. |
| 5,939,008 A | 8/1999 | Comb et al. |
| | (Continued) | |

FOREIGN PATENT DOCUMENTS

| | | |
|---|---|---|
| CN | 204936224 U | 1/2016 |
| CN | 105339154 | 2/2016 |
| | (Continued) | |

OTHER PUBLICATIONS

Zhai ("Additive Manufacturing: Making Imagination the Major Limitation"). (Year: 2014).

(Continued)

*Primary Examiner* — Joseph S Del Sole
*Assistant Examiner* — Jamel M Nelson
(74) *Attorney, Agent, or Firm* — Peter J. Ims; Westman, Champlin & Koehler, P.A.

(57) ABSTRACT

A method for additive manufacturing a part using fused deposition modeling 3D printing technology includes projecting a laser image from one or more laser emitters onto a previously printed bead or beads of thermoplastic material forming a portion of the part, along a tool path for a next bead in a subsequent part layer. The laser image has a width of between about 50% to 75% of a commanded beadwidth of the next bead, and is moved along a tool path that is generally transverse to the width thereof, to thereby selectively irradiate and heat the previously printed thermoplastic material to at least a bonding temperature thereof but below a degradation temperature. A bead of thermoplastic material is extruded from an extrusion head and deposited along the tool path while at least a top surface portion of the irradiated material remains at or above its bonding temperature, so that strong adhesion occurs between part layers.

20 Claims, 8 Drawing Sheets

(51) Int. Cl.
*B29C 64/295* (2017.01)
*B29C 64/118* (2017.01)
*B33Y 30/00* (2015.01)

(56) References Cited

U.S. PATENT DOCUMENTS

| | | | |
|---|---|---|---|
| 6,004,124 | A | 12/1999 | Swanson et al. |
| 6,054,077 | A | 4/2000 | Comb et al. |
| 6,274,839 | B1 | 8/2001 | Stone et al. |
| 6,547,995 | B1 | 4/2003 | Comb |
| 6,814,907 | B1 | 11/2004 | Comb |
| 7,122,246 | B2 | 10/2006 | Comb et al. |
| 7,127,309 | B2 | 10/2006 | Dunn et al. |
| 7,168,935 | B1 | 1/2007 | Taminger et al. |
| 8,221,669 | B2 | 7/2012 | Batchelder et al. |
| 8,349,239 | B2 | 1/2013 | Hopkins et al. |
| 8,439,665 | B2 | 5/2013 | Batchelder et al. |
| 8,721,947 | B2 | 5/2014 | Elyasi |
| 8,801,990 | B2 | 8/2014 | Mikulak et al. |
| 8,920,697 | B2 | 12/2014 | Mikulak et al. |
| 8,926,484 | B1 | 1/2015 | Comb et al. |
| 8,955,558 | B2 | 2/2015 | Bosveld et al. |
| 8,974,715 | B2 | 3/2015 | Hopkins et al. |
| 9,085,109 | B2 | 7/2015 | Schmehl et al. |
| 9,724,866 | B2 | 8/2017 | Hopkins et al. |
| 9,878,495 | B2 | 1/2018 | Douglas et al. |
| 10,041,612 | B1 | 8/2018 | Korobkov |
| 10,059,057 | B2 | 8/2018 | Schirtzinger et al. |
| 10,076,876 | B2 | 9/2018 | Mark et al. |
| 10,077,854 | B1 | 9/2018 | Korobkov |
| 10,254,499 | B1* | 4/2019 | Cohen .................. B23K 1/19 |
| 10,513,076 | B1 | 12/2019 | Freakes |
| 10,875,246 | B2 | 12/2020 | Lee |
| 2002/0129485 | A1 | 9/2002 | Mok et al. |
| 2013/0089642 | A1 | 4/2013 | Lipson et al. |
| 2014/0191439 | A1 | 7/2014 | Davis |
| 2014/0232035 | A1 | 8/2014 | Bheda |
| 2014/0291886 | A1 | 10/2014 | Mark et al. |
| 2015/0004274 | A1 | 1/2015 | Ono |
| 2015/0076739 | A1 | 3/2015 | Batchelder |
| 2015/0140151 | A1 | 5/2015 | Schmehl et al. |
| 2015/0145174 | A1 | 5/2015 | Comb |
| 2015/0183070 | A1 | 7/2015 | Jones et al. |
| 2015/0314532 | A1 | 11/2015 | Gordon |
| 2016/0001461 | A1 | 1/2016 | Gardiner et al. |
| 2016/0096327 | A1 | 4/2016 | Fry et al. |
| 2016/0207263 | A1 | 7/2016 | Gordon |
| 2017/0072633 | A1 | 3/2017 | Hsu |
| 2017/0087767 | A1 | 3/2017 | Grewell |
| 2017/0151728 | A1 | 6/2017 | Kune et al. |
| 2017/0157845 | A1 | 6/2017 | Bihar et al. |
| 2017/0165915 | A1 | 6/2017 | Deng et al. |
| 2017/0232679 | A1 | 8/2017 | Gardiner et al. |
| 2017/0259502 | A1* | 9/2017 | Chapiro .................. B33Y 10/00 |
| 2017/0334137 | A1 | 11/2017 | Nystrom et al. |
| 2018/0001567 | A1 | 1/2018 | Juan et al. |
| 2018/0065208 | A1 | 3/2018 | Mori et al. |
| 2018/0085998 | A1 | 3/2018 | von Burg |
| 2018/0117836 | A1 | 5/2018 | Reese et al. |
| 2018/0117837 | A1 | 5/2018 | Reese et al. |
| 2018/0117838 | A1 | 5/2018 | Reese et al. |
| 2018/0117851 | A1 | 5/2018 | Reese et al. |
| 2018/0126637 | A1 | 5/2018 | Tyler et al. |
| 2018/0257302 | A1 | 9/2018 | Kheng et al. |
| 2018/0281278 | A1* | 10/2018 | George .................. B29C 64/264 |
| 2018/0326658 | A1 | 11/2018 | Saito et al. |
| 2019/0134913 | A1 | 5/2019 | Buratto |
| 2019/0210286 | A1 | 7/2019 | Newell et al. |
| 2019/0210287 | A1 | 7/2019 | Newell |
| 2019/0240903 | A1 | 8/2019 | Isobe et al. |
| 2019/0262986 | A1 | 8/2019 | Newell |
| 2019/0351620 | A1* | 11/2019 | Jaiswal .................. G05B 19/19 |

FOREIGN PATENT DOCUMENTS

| | | |
|---|---|---|
| CN | 104842557 B | 2/2017 |
| EP | 2998059 A1 | 3/2016 |
| GB | 2532024 A | 5/2016 |
| JP | 2002500584 A | 1/2002 |
| JP | 2005335380 A | 12/2005 |
| JP | 2016508086 A | 3/2016 |
| JP | 5937249 B1 | 6/2016 |
| JP | 2016141142 A | 8/2016 |
| JP | 2017100304 A | 6/2017 |
| KR | 1020160072182 A | 6/2016 |
| KR | 1020160089805 A | 7/2016 |
| WO | 2009057107 A2 | 5/2009 |
| WO | 2014127426 A1 | 8/2014 |
| WO | 2014153535 A2 | 9/2014 |
| WO | 2015193819 A2 | 12/2015 |
| WO | 2015193819 A3 | 12/2015 |
| WO | 2016014543 A1 | 1/2016 |
| WO | 2016019435 A1 | 2/2016 |
| WO | 2016116139 A1 | 7/2016 |
| WO | 2016119898 A1 | 8/2016 |
| WO | 2017210490 A1 | 12/2017 |
| WO | 2018039260 A9 | 1/2018 |
| WO | 2018039261 A1 | 3/2018 |

OTHER PUBLICATIONS

Japanese Office Action, Application No. 2019-092509, dated Jun. 30, 2020, 8 pages.
Canadian Office Action, Application No. 3,038,750, dated Aug. 26, 2020, 8 pages.
Canadian Office Action, Application No. 3,034,682, dated Feb. 4, 2020, 9 pages.
Korean Office Action, Application No. 10-2019-7008286, dated Feb. 27, 2020, 13 pages.
International Search Report and Written Opinion dated Nov. 29, 2017 for International Application No. PCT/JS2017/048057, filed Aug. 22, 2017.
Japanese Office Action, Application No. 2019-510595, dated Sep. 23, 2020, 6 pages.
Japanese Office Action, Application No. 2019-510590, dated Sep. 23, 2020, 9 pages.
Chinese Office Action, Application No. 201780062984.8, dated Sep. 24, 2020, 9 pages.
Korean Office Action, Application No. 10-2019-7008283, dated May 7, 2020, 10 pages.
Japanese Office Action, Application No. 2019-510590, dated May 19, 2020, 4 pages.
Japanese Office Action, Application No. 2019-510595, dated May 19, 2020, 4 pages.
Chinese Office Action, Application No. 201780062984.8, dated Apr. 22, 2021, 20 pages.
International Search Report and Written Opinion dated Jan. 16, 2018 for International Application No. PCT/US201 7/048056, filed Aug. 22, 2017, 19 pages.
Extended European Search Report from European Patent Application No. 21185497.1, dated Oct. 22, 2021.

* cited by examiner

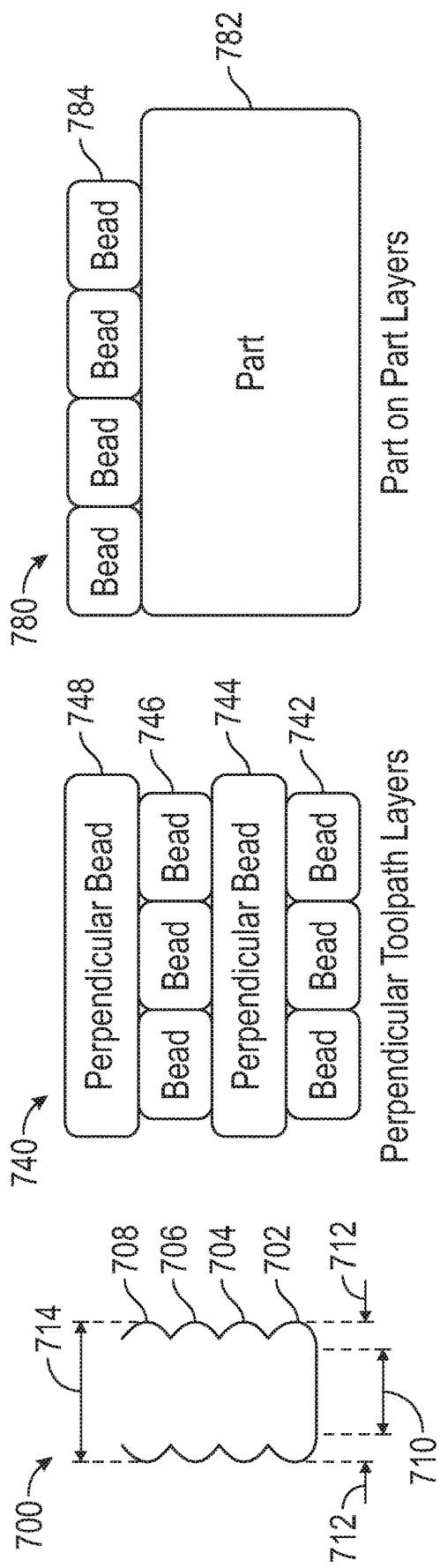
FIG. 7A
FIG. 7B
FIG. 7C
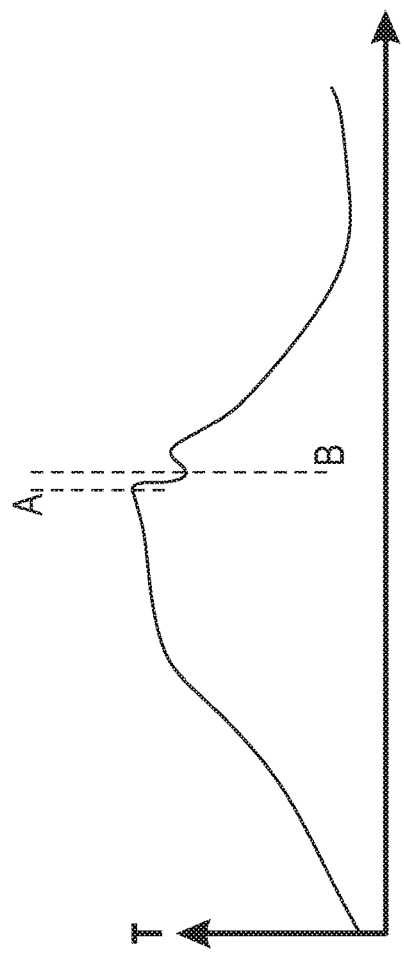
FIG. 8

Pixelation Heating Variations on a Bead Width

LASER PREHEATING IN THREE-DIMENSIONAL PRINTING

CROSS REFERENCE TO RELATED APPLICATION

This application claims the benefit of U.S. Provisional Application Ser. No. 62/765,009 entitled PIXELATED PREHEATING IN THREE-DIMENSIONAL PRINTING which was filed on Aug. 17, 2018, the contents of which are incorporated by reference in its entirety.

BACKGROUND

The present disclosure relates to additive manufacturing systems for printing or otherwise building three-dimensional (3D) parts with layer-based, additive manufacturing techniques. In particular, the present disclosure relates to the preheating of previous layers of parts prior to printing a subsequent layer.

Additive manufacturing, also called 3D printing, is generally a process in which a three-dimensional (3D) object is built by adding material to form a 3D part rather than subtracting material as in traditional machining. Using one or more additive manufacturing techniques, a three-dimensional solid object of virtually any shape can be printed from a digital model of the object by an additive manufacturing system, commonly referred to as a 3D printer. A typical additive manufacturing work flow includes slicing a three-dimensional computer model into thin cross sections defining a series of layers or 3D toolpaths, translating the result into two-dimensional position data, and feeding the data to a 3D printer which manufactures a three-dimensional structure in an additive build style. Additive manufacturing entails many different approaches to the method of fabrication, including fused deposition modeling, ink jetting, selective laser sintering, powder/binder jetting, electron-beam melting, electrophotographic imaging, and stereolithographic processes.

In a typical extrusion-based additive manufacturing system (e.g., fused deposition modeling systems developed by Stratasys, Inc., Eden Prairie, Minn.), a 3D part may be printed from a digital representation of the printed part by extruding a viscous, flowable thermoplastic or filled thermoplastic material from a print head along toolpaths at a controlled extrusion rate. The extruded flow of material is deposited as a sequence of roads or beads onto a substrate, where it fuses to previously deposited material and solidifies upon a drop in temperature. The print head includes a liquefier which receives a supply of the thermoplastic material in the form of a flexible filament, and a nozzle tip for dispensing molten material. A filament drive mechanism engages the filament such as with a drive wheel and a bearing surface, or pair of toothed-wheels, and feeds the filament into the liquefier where the filament is heated to a molten pool. The unmelted portion of the filament essentially fills the diameter of the liquefier tube, providing a plug-flow type pumping action to extrude the molten filament material further downstream in the liquefier, from the tip to print a part, to form a continuous flow or toolpath of resin material. The extrusion rate is unthrottled and is based only on the feed rate of filament into the liquefier, and the filament is advanced at a feed rate calculated to achieve a targeted extrusion rate, such as is disclosed in Comb U.S. Pat. No. 6,547,995.

In a system where the material is deposited in planar layers, the position of the print head relative to the substrate is incremented along an axis (perpendicular to the build plane) after each layer is formed, and the process is then repeated to form a printed part resembling the digital representation. In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material adheres to the part material during fabrication and is removable from the completed printed part when the printing process is complete.

A multi-axis additive manufacturing system may be utilized to print 3D parts using fused deposition modeling techniques. The multi-axis system may include a robotic arm movable in six degrees of freedom. The multi-axis system may also include a build platform movable in two or more degrees of freedom and independent of the movement of the robotic arm to position the 3D part being built to counteract effects of gravity based upon part geometry. An extruder may be mounted at an end of the robotic arm and may be configured to extrude material with a plurality of flow rates, wherein movement of the robotic arm and the build platform are synchronized with the flow rate of the extruded material to build the 3D part. The multiple axes of motion can utilize complex tool paths for printing 3D parts, including single continuous 3D tool paths for up to an entire part, or multiple 3D tool paths configured to build a single part. Use of 3D tool paths can reduce issues with traditional planar toolpath 3D printing, such as stair-stepping (layer aliasing), seams, the requirement for supports, and the like. Without a requirement to print layers of a 3D part in a single build plane, the geometry of part features may be used to determine the orientation of printing.

Creating good adhesion of layers that are being printed to layers that have already been printed is a concern for any fused deposition modeling 3D printing system, and is of particular concern when printing high-temperature thermoplastics in an ambient temperature environment. Printing process using thermoplastic materials have taken place in an ovenized environment to produce good between-layer adhesion and part quality, especially for materials having melt temperatures above 125 degrees Celsius (C). An ongoing need exists for improved methods of creating strong bonds between adjacent layers and beads of deposited material in fused deposition modeling 3D printing systems.

SUMMARY

In one embodiment, a method for additive manufacturing a part in a fused deposition modeling 3D printer includes providing a partially printed part comprising previously-printed beads formed of a thermoplastic material, and instructing a tool path along the partially printed part for printing a bead of thermoplastic material in a next layer of the part. A laser image is projected from one or more laser emitters onto the tool path, the laser image having a width of between about 50% to 75% of a commanded beadwidth of the bead. The bead of thermoplastic material is extruded from an extrusion head. The tool path is preheated by moving the laser image along the tool path ahead of the extrusion head to selectively irradiate the thermoplastic material of the partially printed part with a field of light energy having a power intensity sufficient to heat the thermoplastic material irradiated by the laser image to a temperature at or above a material-specific bonding temperature and below a degradation temperature of the thermoplastic material forming the previously-printed beads. The bead of thermoplastic material is deposited from the extrusion head along the tool path while the thermoplastic material irradiated by the laser image remains at or above the material-specific bonding temperature, so that diffusion occurs between part layers.

In another embodiment, a method for additive manufacturing a part in a fused deposition modeling 3D printer includes providing a partially printed part comprising previously-printed beads formed of a thermoplastic material, and instructing a tool path along the partially printed part for printing a bead of thermoplastic material in a next layer of the part. A laser image is projected from one or more laser emitters onto the tool path, the laser image having a width less than a commanded beadwidth of the bead. The bead of thermoplastic material is extruded from an extrusion head. The laser image is moved along the tool path ahead of the extrusion head to preheat the tool path to selectively irradiate the thermoplastic material of the partially printed part with a field of light energy having a power intensity sufficient to heat the thermoplastic material irradiated by the laser image to a temperature at or above a material-specific bonding temperature and below a degradation temperature of the thermoplastic material forming the previously-printed beads. The bead of thermoplastic material is deposited from the extrusion head at a head velocity along the tool path while the thermoplastic material irradiated by the laser image remains at or above the material-specific bonding temperature so that adhesion occurs between part layers. The power intensity of the field of light energy is dynamically varied as a function of the head velocity to deliver energy sufficient to heat the thermoplastic material irradiated by the laser image above the material-specific bonding temperature and below the degradation temperature of the thermoplastic material.

In another embodiment, a system for 3D printing a part includes an extrusion head configured to extrude beads of thermoplastic material and deposit the beads of thermoplastic material in layers along tool paths, and wherein the deposited beads of thermoplastic material have a width. A laser array having at least one laser emitter each emitting a laser output, wherein the laser output of each of the at least one laser emitters forms a laser image that may be projected towards the tool paths immediately preceding deposition of beads from the extrusion head and is capable of heating the thermoplastic material to a first predetermined printing temperature thereof. A laser array control is configured to provide control parameters to the laser array to control a power of the laser array and a size of the projected image of the laser array, wherein the size of the projected image is between about 50% to 75% of the width of the beads, and wherein the laser image is generally centered along the tool paths.

Definitions

Unless otherwise specified, the following terms as used herein have the meanings provided below:

The term "bead" refers to a printed strand of thermoplastic material typically having an obround, oval or generally rectangular cross-sectional geometry. A bead is also sometimes referred to as a "road".

The terms "beadwidth" or "width of a bead" refers to the lateral dimension of a bead across its width. These terms are synonymous with "road width".

The term "tool path" refers to a planned path of extrusion along which a bead is deposited.

The term "planar tool path(s)" refers to tool paths in a planar layer within a print plane (or in some systems may be slightly out of the print plane) that are utilized in traditional layer-wise fused deposition modeling 3D printers and may also be used in robotic additive manufacturing systems.

The term "3D tool path(s)" refers to tool paths in any direction in free space.

The term "robotic additive manufacturing system" refers to a fused deposition modeling 3D printer or print system utilizing a robot arm or similar to carry a print head or extruder and is capable of extruding material in planar tool paths and 3D tool paths.

The term "material-specific bonding temperature" is the temperature at which the material forming the previously printed part portion will bond to the same material or to a second material.

The term "degradation temperature" is the temperature at which the material will degrade, where the degradation temperature is dependent upon temperature and time at the temperature.

BRIEF DESCRIPTION OF THE DRAWINGS

FIG. 7A is a side view of a portion of a three-dimensional part.

FIG. 7B is a side view of a portion of another three-dimensional part.

FIG. 7C is a side view of a portion of yet another three-dimensional part.

FIG. 8 is a graph of representative temperature profile of temperature correlated to position.

DETAILED DESCRIPTION

Parts are produced in fused deposition modeling 3D printers by extruding beads of thermoplastic materials from an extruder (also referred to as a print head) in layers along tool paths. A method of the present disclosure creates strong bonds between adjacent beads of thermoplastic material that span layers of a printed part by selectively preheating previously-deposited beads along an instructed tool path for depositing a subsequent bead using sized laser images. The use of a localized preheating operation enables elimination of a high-heat, ovenized build environment or a reduction of the temperature in the build environment.

The disclosure includes using a laser preheater to irradiate a targeted zone of a bead or beads that form a previously-printed portion of the part with a laser image. The targeted zone has a width extending transverse to a tool path for depositing the next bead onto the previously-printed portion in a subsequent layer, wherein the width is in the range of 50-75 percent of the beadwidth of the next bead to be printed. The laser preheater emitting the laser image is driven along the tool path to heat the thermoplastic material in the targeted zone to a material-specific bonding temperature, just ahead of an extruder that deposits the next bead. Established thermoplastic additive manufacturing methods can be used to deposit the beads of thermoplastic materials along the tool paths.

The present disclosure recognizes that applying heat to the full beadwidth of printed material wastes energy, and can degrade the thermoplastic part material at its edges. Providing pre-heating laser energy to the edges of a bead, which are slightly rounded and have less volume, has been discovered to be unneeded from an energy input and bonding standpoint, but could also result in part deformation and/or material degradation and burning. Targeting the center portion of a bead with a preheating laser image avoids these problems, and allows bonding of new beads onto fully cooled previous layers, by supplying enough local energy at the appropriate location to bring the material along the tool path up to an adherable temperature range. Optionally, temperature sensing and feedback control to the energy source can be used together with the laser preheating of the present disclosure as a closed-loop control of the heat applied and temperatures reached along the toolpath.

The laser preheater is in one embodiment part of a system for 3D printing of a part, wherein the laser preheater is juxtaposed next to an extruder configured to extrude and deposit beads of thermoplastic material along tool paths. An example of a three-dimensional printer on which embodiments of the present disclosure may be practiced is discussed in further detail in published applications WO 2018/039260 and WO2018/039261, which are incorporated in their entireties herein by reference to the extent not inconsistent herewith.

Figure 2:
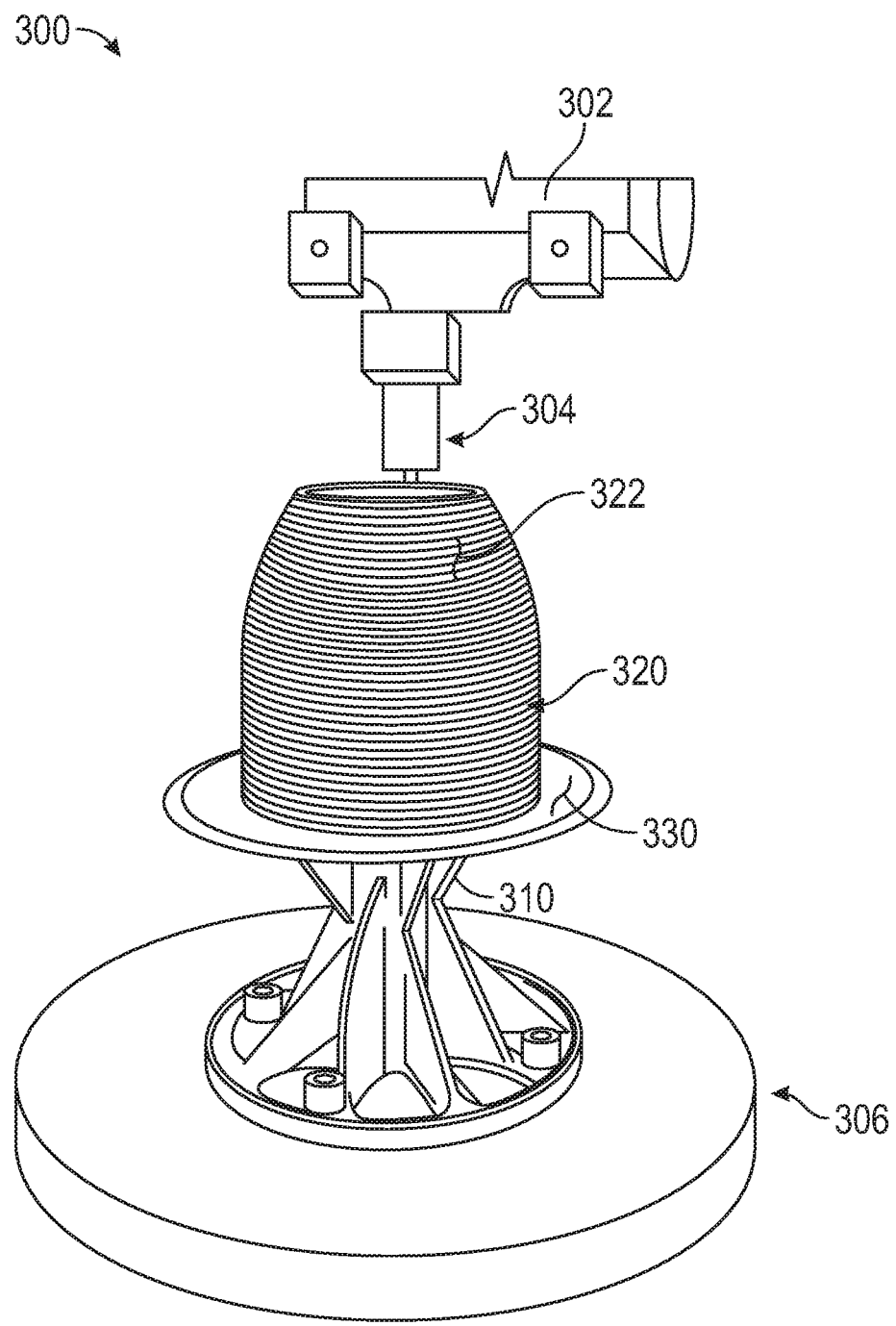
FIG. 2 is a perspective view of a part being printed in a multiple axis robotic build system using methods of the present invention.

FIG. 2 shows a multi-axis robotic build system 300 in process of building a part 320. A robotic arm 302 carries a print head 304, such as, by way of example only and not by way of limitation, an extrusion head or print head 304 for printing parts from a filament feedstock, powder or pellet feed stock, or the like. The print head 304 may be an extrusion type print head, including by way of example only and not by way of limitation, a print head that utilizes a screw extruder such as is disclosed in Bosveld et al. U.S. Pat. No. 8,955,558; a viscosity-pump liquefier such as is disclosed in U.S. Pat. No. 6,004,124; a ribbon liquefier such as is disclosed in Batchelder et al. U.S. Pat. No. 8,439,665; or a gear-pump liquefier such as is disclosed in Hjelsand et al. WO 2016/014543A1. In each case, the print head 304 extrudes and deposits beads of thermoplastic material in accordance with a commanded beadwidth along an instructed tool path.

Part 320 illustrates a hollow build structure wherein adjacent beads having a continuous spiral tool path are deposited one on top of another in printed part layers 322. Part 320 is being built on a build platform 306, extended portion 310, and a build sheet 330. The build sheet 330 is removably adhered to the build platform 306, such as by way of example adherence by vacuum force as is disclosed in Comb et al., U.S. Pat. No. 5,939,008. The build sheet 330 provides a removable substrate on which to build the part 320. Other print foundations are known and may be used in place of the sheet substrate, for example, a build substrate, which may be a tray substrate as disclosed in Dunn et al., U.S. Pat. No. 7,127,309, fabricated from plastic, corrugated cardboard, or other suitable material, and may also include a flexible polymeric film or liner, painter's tape, polyimide tape, or other disposable fabrication for adhering extruded material onto the build platform 306.

Part 320 is printed in one embodiment using a single continuous 3D tool path. That is, a portion or entirety of part 320 may be printed using a single tool path, not a series of sliced layers as is done for creating planar tool paths. For example, printing may be in a helical pattern, with gradually increasing height, yet printed with a single continuous extrusion of material from print head 304. A controller (not shown) contains software and hardware for controlling the motion of the robotic arm 302 and the build platform 306, as well as the printing operation of the print head 304. Controller receives, executes, and/or generates instructions for moving a nozzle of print head 304 along the 3D tool path and depositing an extruded bead of thermoplastic material at a controlled head speed. Controller prints the part layers 322 in accordance with a commanded beadwidth by controlling the head speed and the rate of material extrusion through the nozzle having a specified orifice size. To print part 320, the robotic arm 302 could move and the build platform 306 could be stationary. Or, the build platform 306 could rotate in an x-y plane, gradually increasing in z, with or without moving the robotic arm 302.

The thermoplastic materials used in the present disclosure can consist of either amorphous or semi-crystalline thermoplastics, such as the filament materials available from Stratasys, Inc. under the FDM trademark. A filament may comprise a blend of an amorphous polymer and a semi-crystalline polymer. Amorphous polymers may include a polyarylsulfone such as PSU, PESU, PPSU, PES, or PEI. Further amorphous polymers may include polyphenylene oxides (PPOs), acrylonitrile butadiene styrene (ABS), methyl methacrylate butadiene styrene copolymer (ABSi), polystyrene (PS), or polycarbonate (PC). Semi-crystalline polymers may include PEEK, PEKK, PA, PE, PP, PPS, LCPs, and PTFE.

The thermoplastic materials may be neat or filled, with or without particulate, fiber or continuous fiber content. Particulates may consist of a variety of materials and particulate sizes, including powders such as carbon black or colorants, ceramics, inorganic materials, and metal powders. Continuous fiber composite materials may consist of glass, carbon, aramid, cotton, silicon carbide, polymer wool, metal or any combination thereof. A chopped non-continuous fiber material may also be added to the thermoplastic matrix material. Additional additives that may be used in thermoplastics include by way of example only and not by way of limitation, powder fillers (carbon black, colorants, etc.), sheet fillers (graphene, nanoclay, etc.), or also polymer blends, alloys, etc.

The melting temperature of the thermoplastic material can range from 100-450 degrees C. Thermoplastic materials with higher melting temperatures have a higher strength and are desirable for use in manufacturing applications, such as the aeronautics and automotive industries. High temperature materials such as polyetheretherketone (PEEK), polyetherimide (PEI), polyphenylsulfone (PPSU), polysulfone (PSU), and polyphenylene sulfide (PPS), polyaryletherketone (PAEK), polybutylene terephthalate (PBT), polyethersulfone (PES), and polyetherimide (PEI) are desirable because of their strength, but are also challenging to build with, because part quality is optimized when building in a high temperature environment. Out-of-oven building with high-temperature materials requires localized deposition of energy to promote layer-to-layer bonding. The cooler the build environment, the cooler the previous printed layer becomes before laying another layer on top of it, causing weaker layer-to-layer adhesion and lower overall part strength.

In the present disclosure, in applications where the thermoplastic material is a semi-crystalline material, a bonding temperature is reached when at least a portion of at least a component of the previously printed thermoplastic material is heated to a melting temperature of the component of the thermoplastic material. In applications where the thermoplastic material is amorphous, a bonding temperature is reached when the previously-printed thermoplastic material is heated to a glass transition temperature. In any case, the preheated temperature is targeted to remain below a degradation temperature of the thermoplastic material.

Figure 4:
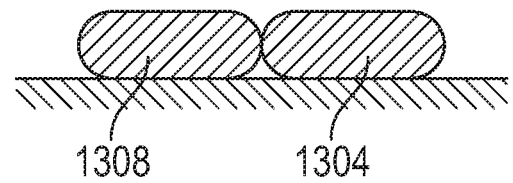
FIG. 4 is a representation of beam overlap of a pixel element according to FIG. 3.

FIG. 4 provides a sectional view of two typical beads that have been deposited by a 3D printer in printing a portion of a part. As shown in FIG. 4, roads 1304 and 1308 have obround shapes that include a flat top surface, a flat bottom surface, and two rounded side surfaces. Controller receives tool path instructions for printing a bead in accordance with a layer of a part to be printed. Controller cause a bead to be printed by sending instructions to move the extrusion nozzle along the tool path for the bead while also sending instructions to extrude molten thermoplastic material. The tool path instructions are also sent to motion controller 906 of the laser preheater. In some embodiments, the functionality of controller 308 is performed by controller 906, controlling both the extruder and the laser preheater.

Various types of lasers may be used, as long as they are capable of targeting energy into only a portion of a commanded beadwidth. The laser for use in the preheater of the present invention may be selected from a variety of lasers including, by way of example, gas lasers, chemical lasers, dye lasers, metal-vapor lasers, solid-state lasers, semiconductor lasers, free electron laser, gas dynamic laser, nickel-like samarium laser, Raman laser, nuclear pump laser, vertical cavity surface emitting lasers (VSCELs), and any combination thereof. An array of laser elements may be used in one embodiment, wherein individual elements of the laser array can be engaged to apply heating only where needed. The width of an individual laser element can be adjusted through a variety of means, either through emitter geometry, and optical manipulations.

The laser heat source of the present disclosure may comprise one or more laser arrays, for example a modular array of laser heating elements, such as in one embodiment an array of laser diodes, or in another embodiment Vertical Cavity Surface Emitting Laser (VCSEL) pixel elements, which are used to precisely and locally heat material in a desired location. In a VCSEL embodiment of the present disclosure, the VCSEL pixel elements are arranged in an array so that selective activation of pixel elements at a given power allows heating along a tool path of the upcoming or recently deposited bead of material. In a laser diode array embodiment, the laser diodes may be arranged in an array, particularly a linear array, and driven independently to create the patterns and heating functions described herein.

In the automated tape placement, or ATP, technology sector, lasers are commonly used to pre and post heat thermoset and continuous fiber tape materials as they are placed together. Since the geometry of tape is flat, laser energy directed to the tape is evenly absorbed, and degradation is more easily avoided through adequate control. With fused deposition modeling, the geometry of a tool path or 'bead', use of lasers for heating the bead provides overheating at the edges, and not enough heating in the internal portion of the bead. By lasing the center portion only, the risk of degradation is reduced during the process. ATP differs from the embodiments of the present disclosure in that with tape, the incoming layer is a solid and then it is lased.

Figure 1:
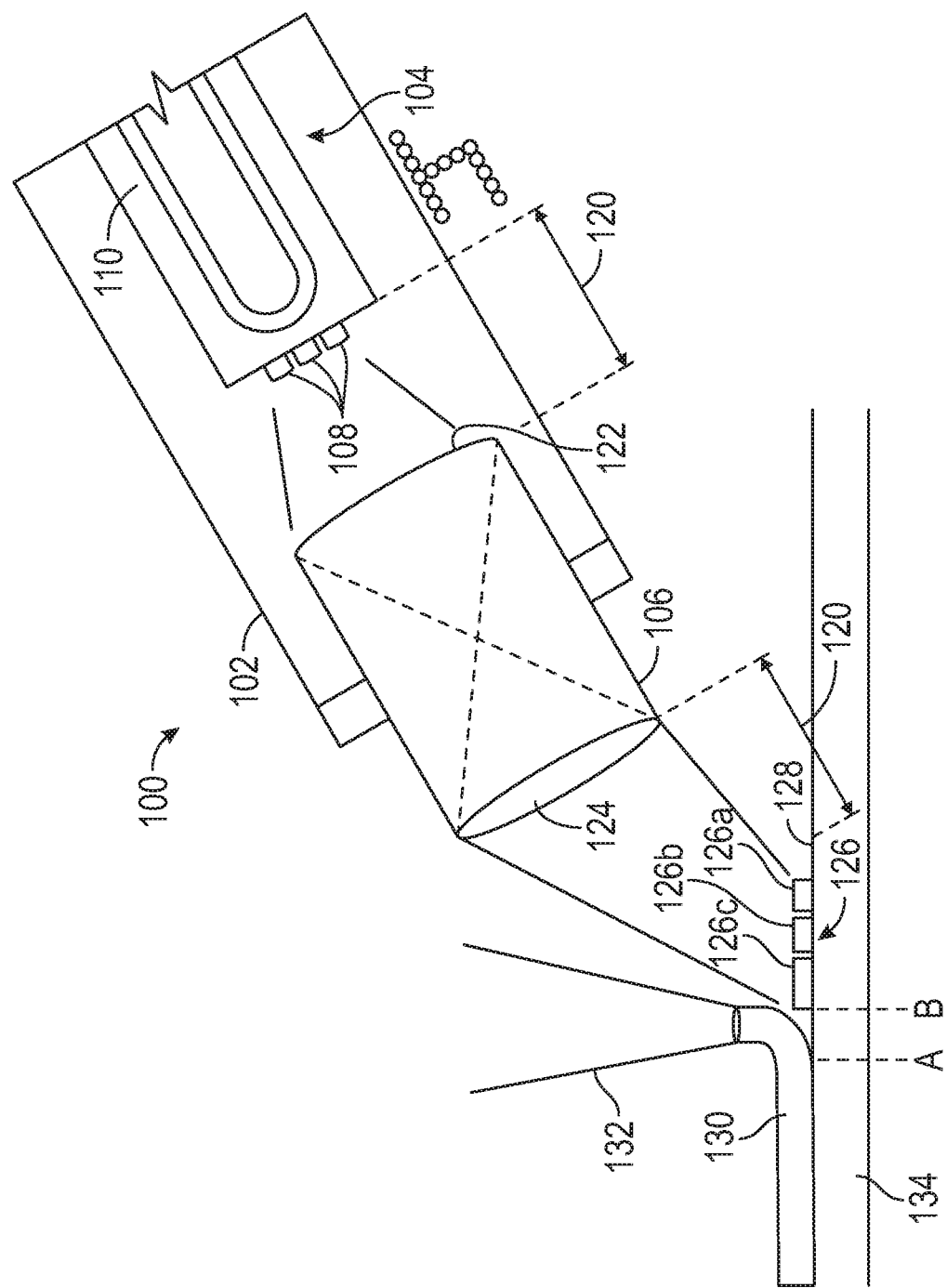
FIG. 1 is a side elevation view of a system for preheating previously printed thermoplastic material along a tool path immediately prior to depositing a new bead of thermoplastic material along the tool path in a next layer, according to an embodiment of the present disclosure.
Figure 3:
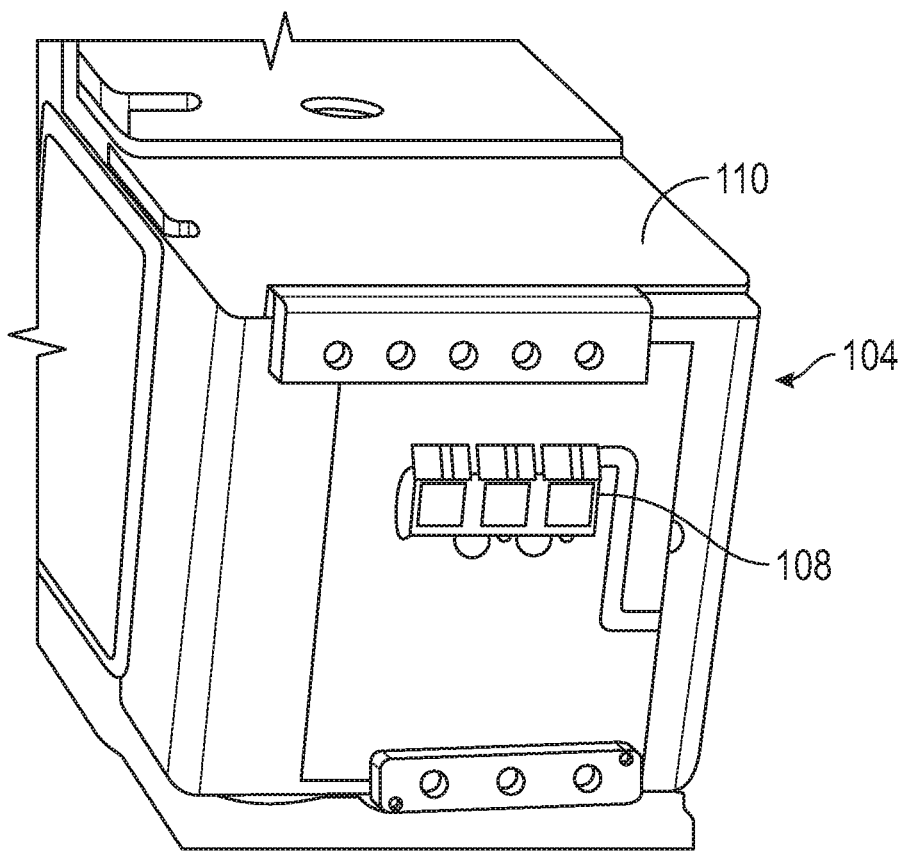
FIG. 3 is a view of an array of pixel elements according to an embodiment of the present disclosure.

Localized pre-heating according to the present disclosure is performed in one embodiment with laser preheater 100 shown in FIG. 1. System 100 comprises in one embodiment a mount 102 on which are mounted a laser heater or system 104 and a lens 106. Laser heater 104 comprises in one embodiment one or more laser emitters, such as for example a plurality of Vertical Cavity Surface Emitting Laser (VCSEL) pixel elements 108 arranged in an array, and a heat sink 110 for the VCSEL pixel elements 108. A laser system 104 may be a laser array having at least one laser emitter each emitting a laser output, wherein the laser output of each of the at least one laser emitters forms a laser image that may be projected towards the tool paths immediately preceding deposition of beads from the extrusion head. The laser system 104 is capable of heating the thermoplastic material to a material-specific bonding temperature, which may be a glass transition temperature, or another determined temperature based on material type and ambient conditions. In another embodiment, laser heater 104 comprises an array of laser diodes, and the lens 106 would not be utilized As shown in FIG. 3, in one embodiment, three VCSEL pixel elements 108 are arranged in a 1×3 linear array. Each VCSEL pixel element 108 comprises a plurality of individually controllable microemitter elements. In one embodiment, each VSCEL pixel element 108 comprises a 20×20 square array of microemitters, each on the order of ~10 um (not shown). It should be understood that the size of the array of VCSEL pixel elements 108 as well as the number of microemitters in a singular VCSEL pixel element may be changed without departing from the scope of the disclosure. Each VCSEL pixel element 108 may be individually controlled, and each VCSEL pixel element 108 is also individually controllable apart from the other VCSEL pixel elements 108. A combination of microemitters of a VCSEL pixel element 108 may be activated each to emit laser beams, allowing for a patterned profile to be delivered by a single pixel element 108, or by a combination of pixel elements 108, producing a pixel output.

Lens 106 is used to focus the beams emitted by the VCSELs 108, and is in one embodiment a pass-through or relay lens through which the beams pass, and which inverts the beams. Lens 106 is positioned a distance 120 between the VCSEL pixel elements 108 and a first end 122 of the lens 106, and a same distance 120 between a second end 124 of the lens 106 and a projected image 126 of the pixel output from VCSEL pixel elements 108. The method may further comprise adjusting power intensity of the plurality of VSCELs individually, or adjusting a pattern of microemitters of each of the plurality of VSCELs individually, or a combination thereof.

The projected image 126 is projected in one embodiment to a tool path 128 at an oblique angle. This geometry allows for the projected image 126 to be projected to very near where a next bead 130 of material is being deposited from a nozzle tip 131 of extruder 132. When the projected image 126 is projected to very nearly where the new bead 130 is being deposited, preheating of the tool path on the bead or beads of the partially printed part occurs, providing a high interface temperature (Ti) between the thermoplastic material along the tool path 128 and the thermoplastic material of new bead 130.

Figure 9:
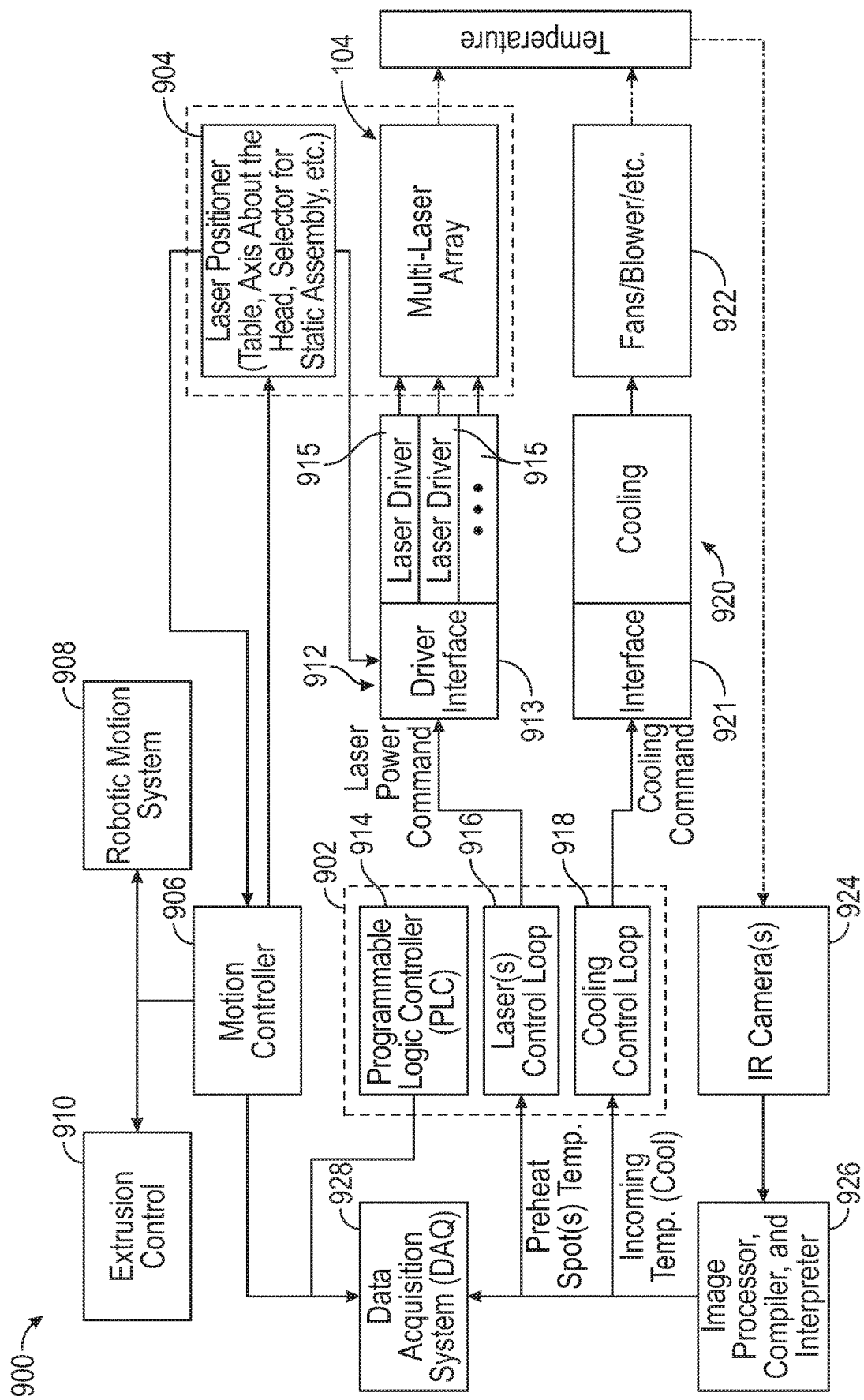
FIG. 9 is a block diagram of a system of three-dimensional printing and a control configuration according to an embodiment of the present disclosure.

A controller 902 for the laser system 104, such as described below with respect to FIG. 9, is configured to provide control parameters to the laser array to control a power of the laser and a size of the projected image of the laser array, wherein the size of the projected image is between about 50% to 75% of the width of the beads, and wherein the laser image is generally centered along the tool paths.

Figure 5:
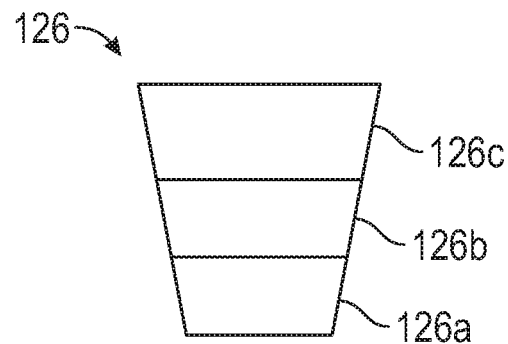
FIG. 5 is top view of a projected image according to an embodiment of the present disclosure.

Pixel images of the projected image 126 actually appear on the tool path as trapezoidal, as shown (not to scale) in FIG. 5, especially as the angle and distance of the laser projection increases. Projected image portion 126c is closest to the new bead 130 being deposited, and as such, is the farthest from the lens 106 and the largest sub-image of the projected image 126. Projected image portion 126b is the second farthest, and projected image portion 126a is the farthest away from bead 130. In order to compensate for spread of the projected image portions 126a, 126b, and 126c, since the VCSEL elements 108 are individually adjustable, many different images may be formed by each VCSEL element 108, including inverse trapezoidal images to focus the projected image 126 to be more square, or rectangular, or in fact any type of image. In the case of a diode laser, the image is shaped like a circle, instead of a rectangle. Projected images become more oval as the angle of projection increases.

A previously printed thermoplastic layer is heated along a tool path by the laser preheater 100 to at least a material-specific bonding temperature during the printing of a bead in a subsequent layer, and to below a degradation temperature of the material. In one embodiment, three VCSEL elements as described herein are used to each provide about 4 Watts per square millimeter (e.g., 12 Watts per 3 square millimeters for the 1×3 pixel element array), sufficient to preheat the tool path to a temperature, in or out of an oven, sufficient to provide an interface temperature between the thermoplastic material along tool path 128 and bead 130 high enough to allow melted contact between the two layers above a glass transition temperature (Tg) of an amorphous material, or a melt temperature of a semi-crystalline material. In all cases, it is desired that only the surface layer of previously-printed beads along the tool path location is being heated and re-melted.

Figure 11:
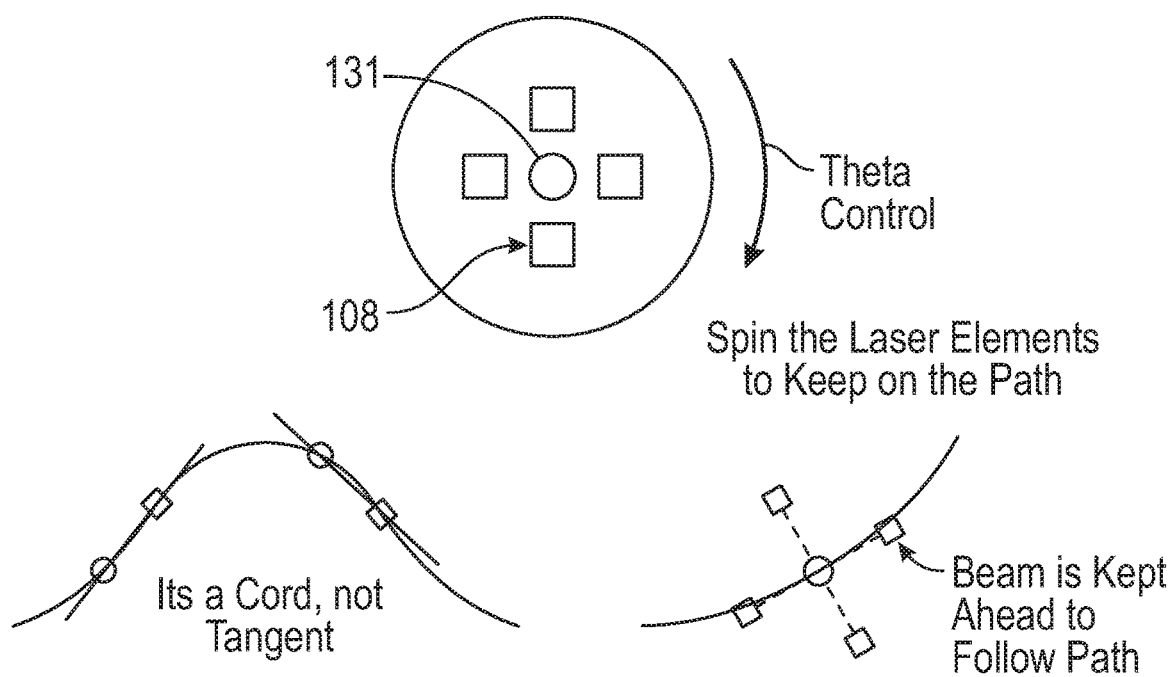
FIG. 11 illustrates a circular laser emitter array around an extrusion nozzle, and implementation of cord/tangent laser directionality placement according to an embodiment of the present disclosure.

Minimizing the distance between extruder nozzle and laser preheater allows for timely application of heat close just prior to deposition, so that the preheated temperature is maintained along the tool path 128 where the next bead 130 is being deposited. The angle of laser energy of the projected image 126 as shown in FIG. 1, allows for preheating very close to the new bead 130 along the tool path 128 location. FIG. 11, in one embodiment, illustrates a methodology for pairing an array of laser elements in close proximity to a deposition nozzle. The projected VCSEL pixel images are arranged as part of a circular array around the circumference of the extrusion nozzle with essentially no gap in spacing between an edge of the projected image and the front of the extruder tip, as illustrated in FIG. 11. Depending on the direction of travel of the extruder tip head, the laser image most directly in front of the extruder head would be activated. In whichever manner of arrangement is chosen, the laser is configured relative to the extruder so that the preheated portion of the tool path does not cool significantly before deposition of the next bead. After laser preheating, a surface temperature of the irradiated material at deposition remains high enough for good bonding.

At faster print speeds (e.g., increased print head velocity), the time between preheating the tool path and depositing a new bead becomes increasingly shorter, advantageously maintaining the preheated temperature for creating strong bonds between layers. At faster printing speeds, higher energy output is required of the laser preheater in order to bring the previously deposited material to a temperature sufficient to allow adhesion with the new bead, as the projected laser image will have a shortened time of contact with the material along the tool path. The actual time required to preheat a location is on the order of milliseconds. Deposition occurs quickly after laser preheating, on the order of 5 seconds or less.

The interface temperature (Ti) between a material along tool path 128 and a new bead 130 is approximately an average of the temperature (Tc) of the previous layer 128 and the temperature (Th) of the bead 130, that is, in general, Ti=(Tc+Th)/2. It is this interface temperature (Ti) that determines whether adhesion occurs between the thermoplastic material along tool path 128 and the thermoplastic material forming new bead 130.

Figure 6:
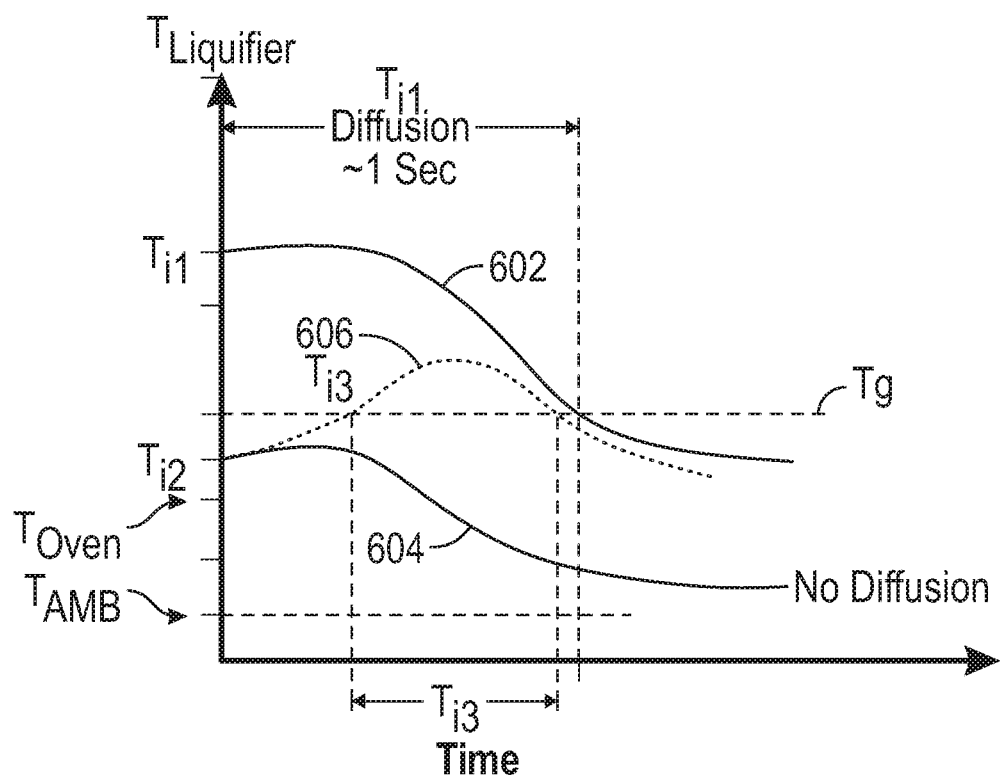
FIG. 6 is a graph of example temperature versus time lines for embodiments of the present disclosure.

A graph of temperature versus time for purposes of illustrating adhesion or diffusion is shown in FIG. 6. FIG. 6 illustrates representative interface temperature lines for typical in-oven (Ti1, line 602) and out-of-oven (Ti2, line 604) printing. With an interface temperature above the glass transition temperature (Tg), adhesion or diffusion between layers occurs. In a typical out-of-oven (line 604) deposition, the interface temperature (Ti2) for higher temperature thermoplastics such as PES or PEEK, does not reach the glass transition temperature (Tg), so no diffusion occurs. For lower temperature thermoplastics, such as polyamides (e.g., nylon), some diffusion may occur. In a typical in-oven (line 602) deposition, diffusion occurs for that portion of the Ti1 line above the glass transition temperature (Tg), in this example, about 1 second. Embodiments of the present disclosure are sufficient to raise the temperature along the tool path 128 to a bonding temperature that will provide an interface temperature high enough to allow an amount of diffusion suitable for good bonding. Diffusion creates stronger parts. Embodiments of the present disclosure can raise the interface temperature, as shown in line 606 (Ti3), so as to allow diffusion in a shorter period of time.

Laser heating, such as but not limited to heating with an array of laser diodes or an array of VSCEL elements, provides temperature increase for printing materials that have absorptive components, such as carbon fiber or other absorptive components, as are known in the field. From an EM radiation standpoint, all materials are technically partially adsorptive at all frequencies. In one embodiment, absorbing materials are tuned around the laser nominal wavelength, so while carbon black is a good adsorber for visible and infrared, a different material may be used for a different wavelength laser, for example a UV laser. The polymer itself could be the primary adsorber in one embodiment.

A typical side view of a portion of a part 700 is shown in FIG. 7*a*, where individual beads 702, 704, 706, and 708 have been deposited in a series of layers. The side profile shows that the beads have a center portion 710 over which they touch, and thinner edge portions 712 over which adjacent layer material does not contact. Depending upon material characteristics, bead size, and the like, the center portion 710 of a part may comprise around 85% of the total width 714 of the part 700. Heating or preheating the edge portions 712 of the part along a tool path at the same intensity as the center portion 710 can waste energy on non-contacting areas of the tool path, or cause material degradation at the edge portions. In one embodiment, about 60% of the bead width is preheated with the laser source.

In FIG. 7B, layers of a 3D part portion 740 alternate in toolpath direction such that an upper layer bead 748 is printed perpendicular to beads 746 in a lower layer. Likewise, an upper layer bead 744 is printed perpendicular to beads 742 in a lower layer. In a part structure such as this, a preheated toolpath for an upcoming deposition will be along an uneven surface, but will still provide a desirable result.

In FIG. 7C, layers of a 3D part portion 780 include a new layer comprising beads 784 deposited onto a previously-printed 3D part portion 782 without regard for directionality of prior toolpaths. So long as the upcoming toolpath location is preheated, the application of heat will allow adherence of the new toolpath.

By selectively heating only a limited portion of the deposited beads, adhesion may be achieved without overheating surrounding material. By tailoring the amount of heat energy put into the layer interfaces to only that which is needed for making good bonds, the need for post-deposition cooling can also be avoided. If the tool paths were preheated across the entire beadwidth of each next bead to be printed, it can lead to excess heat input and part sagging and deformation and require a step of active cooling in order to build a good part.

Figure 12:
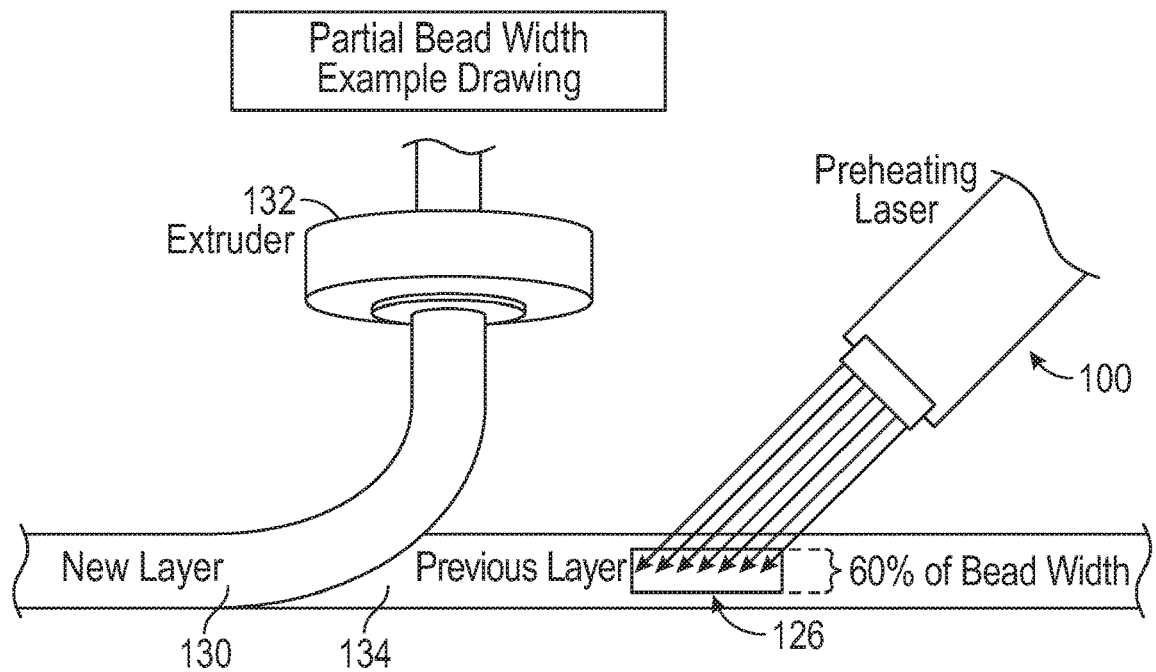
FIG. 12 shows one example of application of heat to a portion of the beadwidth.

Accordingly, center portions 710 (in one embodiment about 60% of bead width) of previously deposited material along a tool path may be targeted for preheating, just prior to deposition of the next layer of a tool path, such as is illustrated in FIG. 12. In one embodiment, focused laser heating is applied across 50-75% of the bead width, in the center portion. More specifically, in another embodiment, heating is applied to 60% of the bead width, in the center portion. The laser energy target area moves as the print head moves, in order to keep it in close proximity to the region where a new bead deposit will be placed. Further, the changeable individual nature of the provision of power from the laser elements allows for ramping temperature up by applying different power levels for different portions 126*a*, 126*b*, and 126*c* of the projected image 126, if desired.

As has been mentioned, preheating may be performed with virtually any pattern, limited only by the patterning of the individual laser emitters, such as laser diodes 1402 (see FIG. 14), or microemitters 109, and by the use of different or varying pixel elements 108. Further, power density may also be varied between VCSEL elements 108. For example, a higher power intensity may be used over a wider area to spread preheating across a bead and provide less preheating, or the same higher power intensity over a smaller area for increased preheating. In one embodiment, each VCSEL pixel element 108 uses a different power density. The pixelated pattern is projected onto the bead, for example as a laser image having a shape or array. If the width of the array is 60% of the bead width size, the length of the laser image shape can be either lengthened, or shortened, to provide a variable desired amount of heat as the print head is passing over the previous tool path.

The energy input to the tool path is dependent on the amount of time that the laser passes over the tool path, as the laser and print head travel together to create a 3D part. The energy output of the laser preheater of present disclosure can be dynamically varied along a length of a tool path as a function of a changing velocity of the extrusion head, to provide a desired amount of energy sufficient to heat the thermoplastic material irradiated by the laser image to a temperature at or above the material-specific bonding temperature and below the degradation temperature of the thermoplastic material. In another embodiment, power intensity of at least one of the plurality of laser diodes is adjusted over the width and length of the previously extruded bead.

In one embodiment, a preheating beam projected image 126 is provided that is slightly narrower than a full contact portion 710 of a tool path on existing material and a new layer of material. For example, if the full contact portion 710 is 60% of a beadwidth, the laser image width could be set to 50% of the beadwidth. In this embodiment, focusing the preheating area to a width that is narrower than the full contact portion eases issues with control of preheating and printing, provides greater heating to a smaller area, and provides a margin of error for part degradation.

In another embodiment, at least one laser may be mounted on or near the print head, and allowed to move synchronously with the movements of the print head as it travels along 3D tool paths. As printing speed increases, more than one laser may be used to provide capability to reach all tool path areas. In another embodiment, movement includes swiveling of laser emitters around the print head to allow for more effective preheating positioning during a 3D build, using a laser emitter configuration such as is illustrated in FIG. 11. Where the laser emitters are arranged in a swivel configuration around the extrusion head, the laser image may be directed ahead of the extrusion head by selectively activating an emitter or emitters that project in front of the extrusion head as it deposits the bead. Symmetrical pairs of lasers may be mounted or near the print head, providing the ability to cover either a 180 degree portion of potential movement for a targeted zone, or even 90 degrees if there are two pairs of symmetrical lasers for preheating, as illustrated in FIG. 11.

In another embodiment, a combination of pixelated and non-pixelated heat sources (e.g., conventional lasers of other heaters) may be combined. Additionally, cooling could also be provided, either before or after preheating, or a combination of before and after preheating.

A representative temperature profile of temperature correlated to position is shown as FIG. 8. Lines A and B on FIG. 1 correspond to lines A and B of FIG. 8 to indicate the position of the graph of FIG. 8 with respect to the physical extrusion of FIG. 1. That is, the lines A and B are in the same position in each of FIGS. 1 and 8. As is shown in FIG. 8, temperature peaks right at the interface between the bead 130 of the new layer and tool path 128, drops between the projected image and the new bead, jumps somewhat upon reaching the projected image, and then drops according to known mechanisms thereafter. The placement of the projected image 126 near the new bead 130 allows for increased printing speed, on the order of feet per second, at relatively high power densities of on the order of 12 Watts per three square millimeters. Pixelating the projected image uses a reduced amount of overall energy to provide preheating.

Embodiments of the present disclosure provide further potential advantages. Quick and efficient preheating of previous layers can provide sufficient energy to smooth out the surface of previous fiber composite layers if desired. Composites with fiber tend to have a somewhat rough surface due to the orientation of fibers during extrusion, as well as the nature of heating using the absorptive fibers in a thermoplastic matrix. This rough surface may reduce the overall amount of contact between previously deposited material along a tool path 128 and a new bead 130, due to the roughness of the surface of the previous material along tool path 128. Using preheating, it is possible to preheat the material along tool paths 128 to a reflow temperature, allowing smoothing by utilizing the innate molten surface tension properties of the material, which can smooth the surface of the previous layer, allowing more, and better, contact between layers, and greater diffusion.

Providing partial beadwidth preheating to a prior layer composed of a different thermoplastic material can allow for satisfactory adherence between that layer, and a new layer. For example, a part composed of two varied thermoplastic layer materials, or a part and support material which are normally not compatible for adherence, can be made to adhere well, without thermally degrading the prior bead material.

System 900 shown in FIG. 9 comprises a multiple-laser emitter array 104 such as has been described above, and is run in part by a system controller 902. A laser positioner 904 is coupled to laser driver 912 to provide laser signals thereto for laser positioning. A motion controller 906 provides input for the laser positioner 904. Motion controller also imparts control signals for the operation of a robotic motion system 908 for controlling operation of a robotic arm or printing platen or build platform, and extrusion controller 910 which controls, for example, speed and rate of extrusion.

System controller 902 comprises a programmable logic controller (PLC) 914, and control loops for laser control (916) and cooling (918). Laser control loop 916 is in one embodiment a closed-loop system that monitors, for example, preheat spot temperatures and provides laser power command input to laser driver 912 through interface 913 to individual laser drivers 915. The closed-loop system may be used to adjust power of the plurality of lasers.

Cooling control loop 918 is in one embodiment a closed-loop system that monitors cooling temperatures and provides cooling commands to cooling unit 920 through cooling interface 921 to control one or more fans, blowers, or the like 922.

Temperatures for use with closed-loop laser and cooling control loops 916 and 918 are determined in one embodiment using a camera system 924 with image processor 926 and data acquisition system 928. It should be understood that different temperature monitoring may be performed, also within closed-loop systems, to provide preheat spot temperatures and cooling temperatures to loops 916 and 918, without departing from the scope of the disclosure. Alternatively, a temperature measurement device may be used along with a control system and a laser driver, in the configuration using an array of laser emitters comprising laser diodes.

Figure 10:
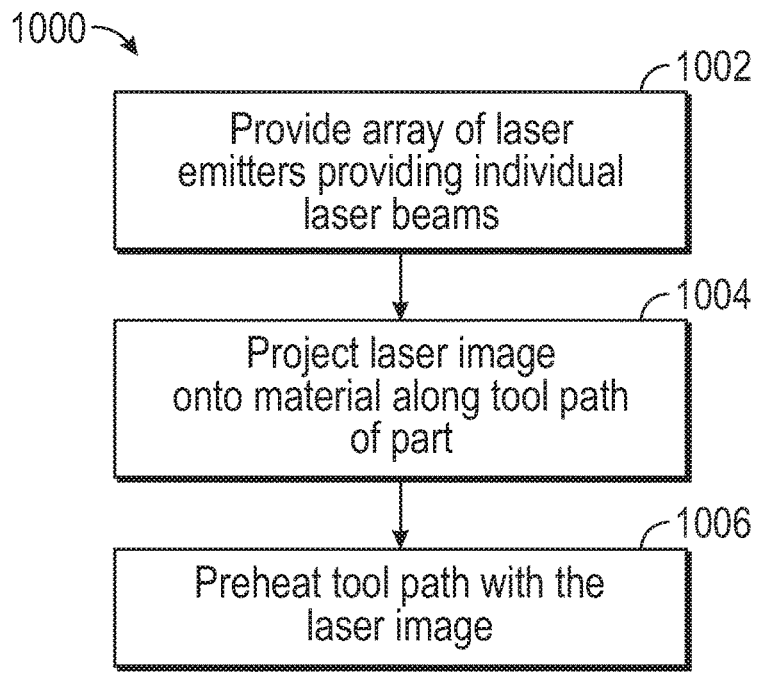
FIG. 10 is a flow chart diagram of a method according to an embodiment of the present disclosure.

FIG. 10 is a flow chart of a method 1000 for preheating a previous part layer prior to deposition of a new part layer. Method 1000 comprises, in one embodiment, providing an array of laser emitters providing individual laser beams in block 1002, projecting a laser image from the laser emitters onto material along a tool path of the three-dimensional part in block 1004, and preheating the tool path with the laser image in block 1006.

The laser image is projected in one embodiment from one or more laser emitters onto a previously printed bead of thermoplastic material forming a portion of the part. In one embodiment, the previously printed bead has a width that is between about 33% to 50% greater than the width of the laser image, wherein the laser image is generally centered across the width of the previously printed bead. Preheating of the tool path is accomplished in one embodiment by moving the laser image over a length of the previously extruded bead along a tool path that is generally transverse to the width thereof, to thereby heat the previously printed thermoplastic material to at least a first predetermined printing temperature thereof. Following preheating a subsequent bead of thermoplastic material is extruded from an extrusion head, and the extruded subsequent bead of thermoplastic material is deposited over the previously printed bead while at least a top surface portion of the previously printed bead remains at or above a bonding temperature for the material printed.

Figure 13:
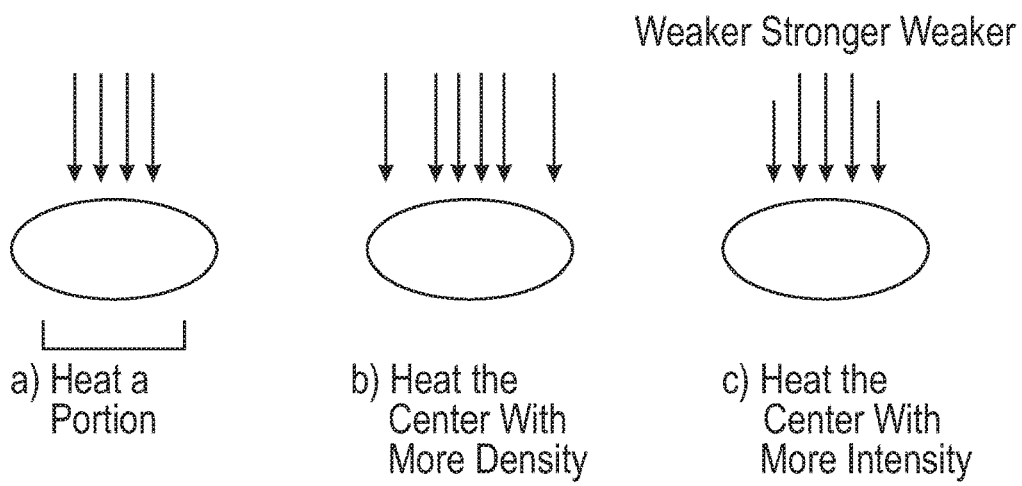
FIG. 13 shows examples of pixilation heating variations on a beadwidth.

FIG. 13 shows examples of pixelation heating variations on a beadwidth. Due to the configurable individual nature of the laser element arrays, and the resulting variable energy input amount, it allows for variations in preheating control across a beadwidth. In FIG. 13A, the amount of energy preheat is equally applied across the 60% beadwidth portion. In FIG. 13B, more laser preheat power can be applied to the center portions of a beadwidth. In FIG. 13C, a larger laser array configuration could be applied to the center location of the 60% beadwidth, as opposed to the outer edges of the 60% portion of the beadwidth. All variations would result in a customizable temperature preheating profile.

It should be understood that preheating may be performed differently for different feedstock, different beadwidths, and the like, without departing from the scope of the disclosure. For example, variable width beads are used in some printing processes. Depending on the type of laser selected, energy input and beam area can be targeted as desired, to provide a variety of temperature options and conditions within a beadwidth. For example, the center portion of the bead could be heated just enough to reach Tg, while the sides of the bead are heated to below Tg. Alternately, the center portion of the bead could be heated to the melting temperature of the thermoplastic material, and conduction of heat could occur into the full width of the bead, without deforming the geometry of the bead. Also, alternatively, the center portion of the bead could be heated briefly above the melting temperature of the material, and conduction of heat could occur not only into the full width of the bead, but also into previous layers, providing more heat to the overall part, and further strengthening the interlayer connections. In some embodiments, variable beadwidths may be printed, such as is shown in U.S. Pat. No. 10,019,415 (Swanson et. al), which is hereby incorporated by reference in its entirety. In some embodiments, a width of the projected image may be varied with the varying beadwidths.

Figure 14:
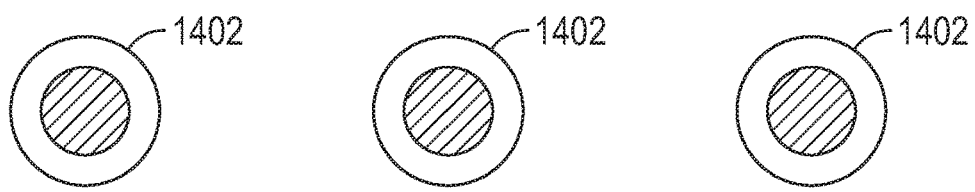
FIG. 14 illustrates an embodiment of an array of laser diodes with which embodiments of the present disclosure may be practiced.

FIG. 14 illustrates another embodiment 1400 of an array of laser emitters comprising laser diodes 1402. The laser diodes 1402 are in this example arranged in a 1×3 array, and driven independently to create the patterns and heating functions described herein.

While VCSEL and laser diode laser sources are discussed in the specification, it should be understood that different laser sources may also be arranged, focused, and/or pixelated to project a laser image having a selected shape and size. Any laser source that is used to heat a target narrower than a full bead width may be suitable for use with the embodiments of the disclosure.

Laser irradiation may be used in various embodiments as a general mechanism to do things other than energy absorption for heat, such as photo-chemistry or intentional charring, in a way similar to how electron beam exposure can be used for cross-linking.

Embodiments of the present disclosure may be combined with other heating, cooling, preheating, and the like. For example, the previous and current layer of a part may be heated, preheated, cooled, or the like.

Example

A part consisting of a hollow octagon shape was printed, of a dimension roughly 12 inches×18 inches and having a single bead wall width. The part was printed using a Stratasys® Fortus® 900mc print head in an ambient environment configuration, using the laser preheat method of the present disclosure. A VSCEL laser array with used as the laser source for the preheater. A liquefier tip having a 2 mm diameter opening) was used. The beadwidth dimension of the deposited beads was roughly 2.4 millimeters (mm). The width of the laser image projected onto the deposited beads was approximately 1.45 mm, or 60% of the beadwidth. The power output of the laser beam was 12 Watts, at a uniform intensity across the laser image. The power was dynamically varied as a function of head velocity to input the appropriate amount of preheating to a location. The pattern used for the laser array was 1×1 mm squares, in a 1×3 pattern. The 3 VSCELs were projected in a line long the length of each previously-deposited bead before printing the next bead. The laser image was projected onto the tool path for upcoming deposition immediately adjacent to the print head nozzle outlet, to insure minimal heat loss. The laser projection was made from roughly 3 inches to a relay lens, positioned between the laser and the bead surface. The thermoplastic printing material used was a PEKK/carbon fiber composite filament having a glass transition temperature of 210 degrees C., using a liquefier temperature of 400 degrees C. After deposition of the bead upon the laser heated region, no localized cooling was required due to the customized energy input of the laser.

Although the present disclosure has been described with reference to preferred embodiments, workers skilled in the art will recognize that changes may be made in form and detail without departing from the spirit and scope of the disclosure.

What is claimed is:

1. A method for additive manufacturing a part in a fused deposition modeling 3D printer, comprising:
   providing a partially printed part comprising previously-printed beads formed of a thermoplastic material;
   instructing a tool path along the partially printed part for printing a bead of thermoplastic material in a next layer of the part;
   projecting a laser image from one or more laser emitters onto the tool path, the laser image having a width of between about 50% to 75% of a commanded beadwidth of the bead;
   extruding the bead of thermoplastic material from an extrusion head;
   preheating the tool path by moving the laser image along the tool path ahead of the extrusion head to selectively irradiate the thermoplastic material of the partially printed part with a field of light energy having a power intensity sufficient to heat the thermoplastic material irradiated by the laser image to a temperature at or above a material-specific bonding temperature and below a degradation temperature of the thermoplastic material forming the previously-printed beads; and
   depositing the bead of thermoplastic material from the extrusion head at a head velocity along the tool path while the thermoplastic material irradiated by the laser image remains at or above the material-specific bonding temperature, so that adhesion occurs between part layers.

2. The method of claim 1, wherein the tool path is coextensive with a length of a previously-printed bead, and wherein the laser image is generally centered on the tool path across a width of the previously-printed bead.

3. The method of claim 1, wherein the material-specific bonding temperature is a glass transition temperature.

4. The method of claim 1, wherein the material-specific bonding temperature is a melting temperature.

5. The method of claim 1, wherein the laser image has a width of about 60% of the commanded beadwidth of the bead.

6. The method of claim 1, wherein the one or more laser emitters comprise an array of vertical cavity surface emitting lasers (VSCELs).

7. The method of claim 1, wherein the one or more laser emitters comprise an array of laser diodes.

8. The method of claim 1, wherein the thermoplastic material of the partially printed part is the same as the thermoplastic material of the bead extruded in the next layer.

9. The method of claim 1, wherein the thermoplastic material of the partially printed part and the thermoplastic material of the bead extruded in the next layer are not the same material.

10. The method of claim 1, wherein power intensity is dynamically varied as a function of the head velocity to deliver energy sufficient to heat the thermoplastic material irradiated by the laser image to a temperature at or above the material-specific bonding temperature and below the degradation temperature of the thermoplastic material.

11. The method of claim 10, wherein commanded beadwidth of the bead is a varying beadwidth, and further comprising adjusting the width of the laser image as a function of the varying beadwidth.

12. The method of claim 1, wherein the method is performed in a heated environment.

13. The method of claim 1, wherein the one or more laser emitters are arranged in a swivel configuration around the extrusion head and wherein the laser image is directed ahead of the extrusion head by selectively activating emitter or emitters that project in front of the extrusion head as it deposits the bead.

14. The method of claim 1, wherein the one or more laser emitters are selected from the group consisting of gas lasers, chemical lasers, dye lasers, metal-vapor lasers, solid-state lasers, semiconductor lasers, free electron laser, gas dynamic laser, nickel-like samarium laser, Raman laser, nuclear pump laser, vertical cavity surface emitting lasers (VCSEL), and any combinations thereof.

15. The method of claim 14, wherein the one or more laser emitters comprise one or more arrays of microemitters, each array forming a pixel having a length, a width, and a power intensity, and further comprising adjusting a power intensity of the one or more pixels over the length and width of the pixel.

16. The method of claim 1, wherein the thermoplastic material of the partially-printed part is at an ambient temperature prior to the preheating.

17. The method of claim 1, wherein the commanded beadwidth of the bead is a varying beadwidth, and further comprising adjusting the width of the laser image as a function of the varying beadwidth.

18. The method of claim 1, and further comprising adjusting a power intensity of at least one of the plurality of laser emitters over the length of the tool path.

19. The method of claim 1, and further comprising adjusting a power intensity at least one of the plurality of laser emitters over the width of the laser image.

20. A method for additive manufacturing a part in a fused deposition modeling 3D printer, comprising:
    providing a partially printed part comprising previously-printed beads formed of a thermoplastic material;
    instructing a tool path along the partially printed part for printing a bead of thermoplastic material in a next layer of the part;
    projecting a laser image from one or more laser emitters onto the tool path, the laser image having a width less than a commanded beadwidth of the bead;
    extruding the bead of thermoplastic material from an extrusion head;
    preheating the tool path by moving the laser image along the tool path ahead of the extrusion head to selectively irradiate the thermoplastic material of the partially printed part with a field of light energy having a power intensity sufficient to heat the thermoplastic material irradiated by the laser image to a temperature at or above a material-specific bonding temperature and below a degradation temperature of the thermoplastic material forming the previously-printed beads; and
    depositing the bead of thermoplastic material from the extrusion head at a head velocity along the tool path while the thermoplastic material irradiated by the laser image remains at or above the material-specific bonding temperature so that adhesion occurs between part layers,
    wherein the power intensity of the field of light energy is dynamically varied as a function of the head velocity to deliver energy sufficient to heat the thermoplastic material irradiated by the laser image above the material-specific bonding temperature and below the degradation temperature of the thermoplastic material.

* * * * *